Patented Dec. 4, 1923.

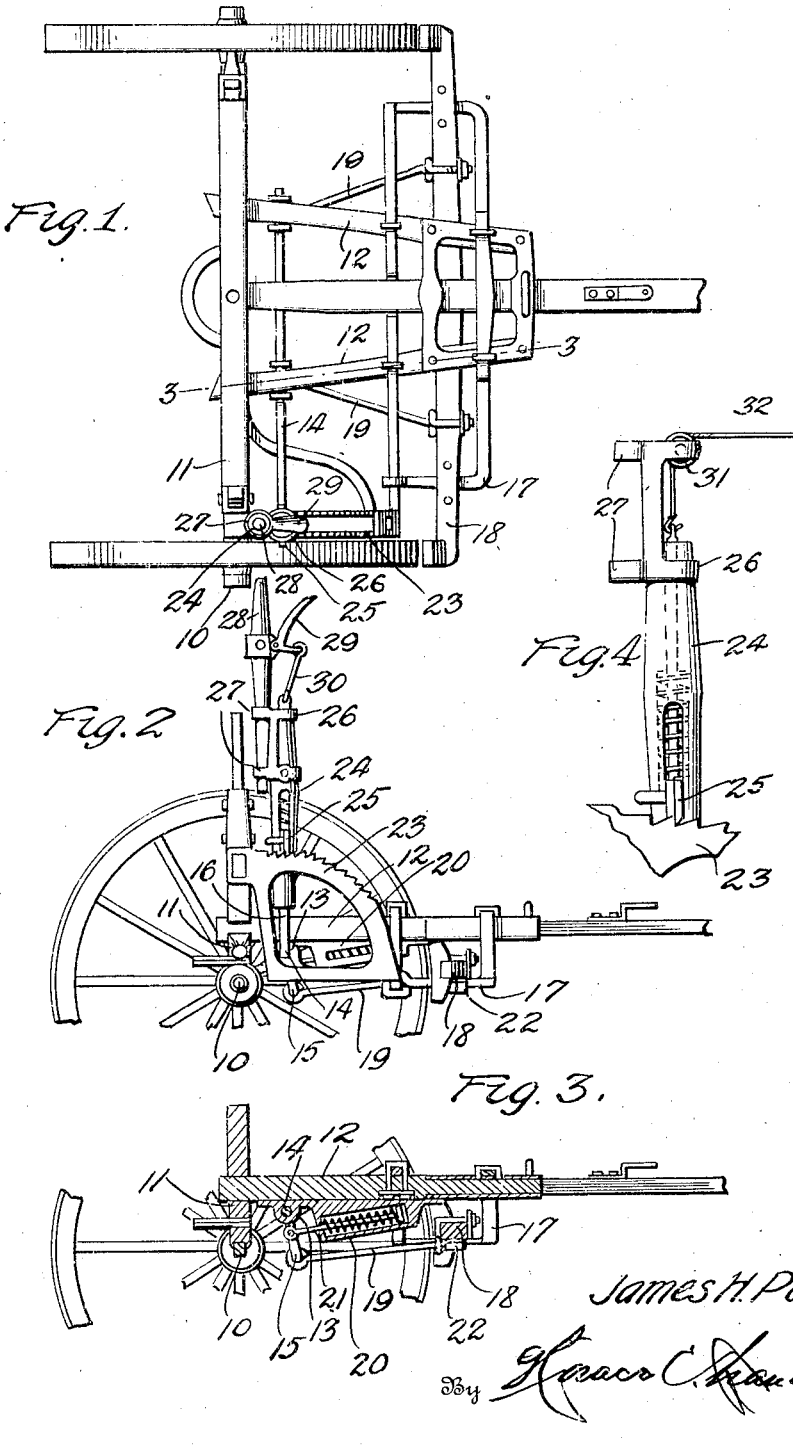

1,476,415

UNITED STATES PATENT OFFICE.

JAMES H. PASHIA, OF OLD MINES, MISSOURI.

VEHICLE BRAKE.

Application filed October 3, 1922. Serial No. 592,590.

*To all whom it may concern:*

Be it known that I, JAMES H. PASHIA, a citizen of the United States, residing at Old Mines, in the county of Washington, State of Missouri, have invented certain new and useful Improvements in Vehicle Brakes; and I do hereby declare the following to be a full, clear, and exact description of the invention, such as will enable others skilled in the art to which it appertains to make and use the same.

This invention relates to new and useful improvements in brakes and particularly to vehicle brakes.

One object of the invention is to provide a brake for a vehicle, and especially for a vehicle adapted for hauling logs, and the like, and means whereby the brake may be readily and easily applied and released, from the seat, by the driver.

Another object is to provide a device of this character by means of which the driver, who rides one of the leading horses of the team, may readily and easily apply or release the brakes.

A further object is to provide a brake operating mechanism which is readily and easily capable of transformation from the seat operated to the distant operated arrangement.

Other objects and advantages will be apparent from the following description when taken in connection with the accompanying drawing.

In the drawing:

Figure 1 is a top plan view of the brake mechanism, forming the subject-matter of the present application.

Figure 2 is a side elevation of the same.

Figure 3 is a vertical longitudinal sectional view on the line 3—3 of Figure 1.

Figure 4 is a detail of a modification of the brake lever mechanism, showing the arrangement of the parts when the same is to be operated by the driver seated on one of the leading horses of the team.

Referring particularly to the accompanying drawings, 10 represents the axle, on which is mounted the bolster, and to which is secured the rear hounds 12, the said bolster being represented at 11.

Mounted on the rear portions of the hounds 12 are the bearing brackets 13, and rotatably supported in these brackets in transverse relation to the hounds, is the shaft 14. Secured to the shaft 14, directly beneath each hound bar, is a downwardly and forwardly extending crank loop 15, and on one end of the shaft is a radially extending arm 16. Slidably supported on the brackets 17, which brackets are carried by the hounds 12, is the brake beam 18, and secured to the beam are the rods 19, which have their other ends pivotally connected with the crank loops 15 of the shaft 14. On the lower face of each of the side bars of the hounds 12 is mounted a casing 20, and slidable in each casing is a spring retracted rod 21, said rod having its other end pivotally connected to a crank loop 15, whereby the brake beam will be normally and yieldably held in inoperative position. Straps 22, secured to the brake beam, loosely embrace the brackets 17, to maintain the beam in proper alignment with respect to the other parts of the device, and to the wheels of the vehicle.

Secured to one end of the bolster 11, and to a portion of one of the brackets 17, is ratchet-toothed bracket 23, within which the before-mentioned arm 16 is movably disposed. Carried by the arm 16, and extending vertically above the toothed bracket 23, is a lever section 24, within which is mounted a slidable spring pressed pawl 25, engaging with the teeth of the ratchet 23. Removably engaged on the upper end of the lever section 24 is a casting 26 which has a pair of vertically aligned apertured ears 27, on one side thereof for the removable reception of the upper lever section 28. This upper section 28 carries a pivoted hand grip lever 29 which is connected with the upper adjacent end of the stem of the pawl 25 by means of the link 30, said link being removable from the stem, as will be more clearly explained later herein.

When the device is arranged as shown in Figure 2, the release of the pawl 25 is accomplished by moving the hand grip lever 29, which draws upwardly on the pawl, through the link 30, the spring of the pawl moving the pawl downwardly, when the hand grip is released. This arrangement is especially adapted for use when the driver is seated on the vehicle, and can easily reach out and grasp the lever section 28 and the hand grip 29. Forward rocking movement of the lever sections imparts a rocking movement to the shaft 14, with the result that the crank loops 15 pull the brake beam rearwardly into contact with the vehicle wheels, through the medium of the rods 19.

When the brake is to be operated by the driver, who is seated upon one of the lead horses of the team, the casting 26 is removed from the section 24, and replaced thereon, in an inverted position, a roller 31 being then mounted in the upper end of the casting. The upper lever section 28 is also removed. A cord or wire 32 is then secured in the upper end of the stem of the pawl 25, passed over the roller 31, and forwardly to the driver. Upon pull on the cord or wire, the pawl 25 may be lifted out of engagement with the teeth of the bracket 23, and further pull causes the lever section 24 to swing forwardly, rocking the shaft 14, and drawing the brake beam against the vehicle wheels.

There is thus provided a braking device for a vehicle, by means of which the brake may be easily controlled by the driver from his seat on the vehicle, or on the lead horse of the team.

What is claimed is:

1. A vehicle brake-beam operating mechanism including a lever operatively connected with the beam, a member removably carried by the lever and having a roller therein, said member being reversible on the lever to support a section thereabove, a locking pawl carried by the lever, and a flexible element connected to the locking pawl and engaged over the roller for operation by a driver seated upon a lead animal of the draft team.

2. In a vehicle brake-beam operating means including a lever section, a removable and reversible member carried by the lever section, said member being formed for supporting a second lever section in one of its positions and a roller in its other position, a locking pawl on the said lever section, said locking pawl being arranged to be operatively connected with the second lever section at times and to be connected with a flexible element engaged over the said roller at times.

3. In a vehicle brake-beam operating means, a lever section, a removable and reversible member carried by the lever section, said member including a stem, a pair of oppositely directed eyes at each end of the stem, the eyes at one side of the stem being of greater diameter and longitudinally aligned for reception of the said lever section, the eyes at the other side of the stem being of smaller diameter and aligned to receive a removable lever section, one of said larger eyes being provided with transversely aligned roller-pintle receiving openings and arranged to receive a roller therein.

In testimony whereof, I affix my signature, in the presence of two witnesses.

JAMES H. PASHIA.

Witnesses:
W. A. COOPER,
EARL T. PASHIA.